United States Patent [19]

Yamazaki et al.

[11] Patent Number: 4,799,776
[45] Date of Patent: Jan. 24, 1989

[54] FERROELECTRIC LIQUID CRYSTAL DISPLAY DEVICE HAVING A SINGLE POLARIZER

[75] Inventors: Shunpei Yamazaki, Tokyo; Takashi Inujima, Kanagawa; Akira Mase, Kanagawa; Toshimitsu Konuma, Kanagawa; Mitsunori Sakama, Kanagawa; Toshiji Hamatani, Kanagawa; Minoru Miyazaki, Kanagawa; Kaoru Koyanagi, Nagano; Toshiharu Yamaguchi, Kanagawa, all of Japan

[73] Assignee: Semiconductor Energy Laboratory Co., Ltd., Kanagawa, Japan

[21] Appl. No.: 34,165

[22] PCT Filed: Jun. 27, 1986

[86] PCT No.: PCT/JP86/00329

§ 371 Date: Mar. 2, 1987

§ 102(e) Date: Mar. 2, 1987

[87] PCT Pub. No.: WO87/00301

PCT Pub. Date: Jan. 15, 1987

[51] Int. Cl.[4] .................................................. G02F 1/13
[52] U.S. Cl. .................................. 350/350 S; 350/349
[58] Field of Search ............................. 350/350 S, 349

[56] References Cited

U.S. PATENT DOCUMENTS 4,367,924 1/1983 Clark et al. ................. 350/350 S X
4,634,226 1/1987 Isogai et al. ................ 350/350 S X
4,707,078 11/1987 Geary .......................... 350/350 S X

FOREIGN PATENT DOCUMENTS 57-42022 3/1982 Japan.
58-173713 10/1983 Japan.
59-201021 11/1984 Japan.
59-216126 12/1984 Japan.

Primary Examiner—Stanley D. Miller
Assistant Examiner—Richard Gallivan
Attorney, Agent, or Firm—Gerald J. Ferguson, Jr.

[57] ABSTRACT

The liquid crystal display according to this invention comprises a liquid crystal cell having a pair of substrates with faced insides which are provided with electrodes, ferroelectric liquid crystal with a chiral smectic C phase in between said substrates and a polarizing plate on the light incidence side. One of said electrodes is a relfective electrode. The display is utilized with microcomputers, word processors, television or so on, and wherein, due to a small number of parts, the absorption loss of light is small and a reflective plate is prevented from being oxided and therefore degraded in reflection index, since it is not exposed to air.

15 Claims, 2 Drawing Sheets

FERROELECTRIC LIQUID CRYSTAL DISPLAY DEVICE HAVING A SINGLE POLARIZER

BACKGROUND OF THE INVENTION

1. Field of the Invention

The present invention relates to reflect type displays and more particularly, to liquid crystal displays which realize to reduce the thickness of the display portion of microcomputers, word processors, televisions, and the like by the provision of a display panel that uses smectic liquid crystal with an added dye, for instance, a ferroelectric liquid crystal (referred to as FLC hereinafter) of the guest-host type, in particular.

2. Description of the Prior Art

Of the solid state display panel, the system which controls each picture element independently is effective for displays with large area. As such a panel there has been known in the past a display in which the multiplexing drive system is applied to a simple matrix structure of the A4 size with 400 elements in the row and 200 elements in the column direction that is formed by the use of a two-frequency liquid crystal, for instance, a twistic nematic liquid crystal (referred to as TN liquid crystal hereinafter). However, to construct a reflection type liquid crystal display by the use such a TN liquid crystal, two-polarizing plates have to be arranged on the outside of a pair of substrates, rotated mutually by 90°. Moreover, a reflecting plate has to be arranged on the outside (namely, on the furthest side with respect to the incident light) of the polarizing plate. Namely, the light path is as follows: The incident light goes through a first polarizing plate, an opposing glass, an opposing transparent conducting film, TN liquid crystals, a transparent conducting film, a glass substrate, a second polarizing plate, and an aluminium reflecting substrate.

Further, light reflected there proceeds backward to the incidence side through the second polarizing plate. However, use of such TN crystals has many drawbacks such as those listed below.

(1) The amount of reflected light is reduced due to the use of two polarizing plates.

(2) There is observed a loss of light due to absorption of light by the glass substrates.

(3) The reflecting plate becomes cloudy due to oxidation of aluminum by the atmosphere, which induces a reduction in the reflectivity.

(4) When active elements are provided on the inside of the substrate, there is generated an absorption loss caused by the organic resin that exists in these surroundings.

The present invention is aimed at solving these problems.

SUMMARY OF THE INVENTION

Figure 1A:
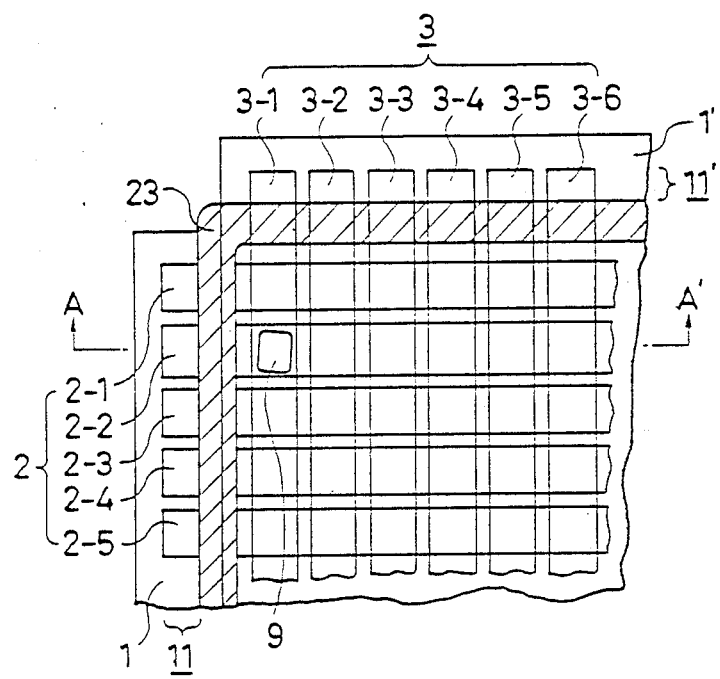
FIGS. 1(A) and 1(B) show a plan view and a longitudinal section view of the passive liquid display panel of the present invention.

In order to solve these problems, in the present invention use was made of ferroelectric liquid crystals that display the chiral smectic C phase (SmC*). Namely, a bistable state can be obtained by setting the separation between the cells to be 4 microns or less.

By mixing liquid crystal material in its isotropic liquid crystal state (high temperature state) in such a thin cell, and by lowering the temperature, SmA and then bistable SmC* are obtained. By so doing, it is possible to loosen the spiral structure. When a voltage is applied to SmC*, molecules are aligned in one direction with an angle of about 45°. By the application of a voltage with opposite sign it is possible to obtain an angle of about −45° (within 45°±5°) in the opposite direction. These two states are nonvolatile in the sense that they hardly change even after the voltage is shut off, retaining an angle of about 90° (within ±10°). With this observation, it became clear that transmission and nontransmission of light can be accomplished by the use of a single polarizing plate. Because of this, the present invention comprises a pair of substrates (one of the light incidence side is called the opposing substrate and the other one of the other side is called simply the substrate) that form a cell, electrodes (one on the light incidence side is called the opposing electrode and the other one on the inner side is called simply the electrode) that are attached to the inside of the substrates, and FLC that is sealed between the electrodes. Further a polarizing plate is arranged on the incident side.

In particular, in the present invention, a layer which reflects light in the visible region of the spectrum was created by one of the electrodes, namely, the electrode on the substrate.

In that case, the incident light passes through the polarizing plate, the opposing substrate, the opposing electrode, FLC, and the electrode where it is reflected, and proceeds backward on the reverse path.

It should be mentioned that one of the unsolved problems in the present invention, namely, the range of the temperature for use, was found satisfactory currently, if if is in the range from 0° to 50° C. for a combination (blending) of a plurality of different kinds of FLC. Therefore, the temperature range was considered to be not much of a problem in the practical applications. In addition, as to the tone, it was found unnecessary provided that the number of colors employed is limited up to eight, so that it became clear that the present invention is usable satisfactorily as the display for microcomputers or the like.

With the above arrangement, the following advantages can be realized. Namely:

(1) Loss of light can be minimized by the use of only one polarizing plate.

(2) The electrode for reflecting light is not exposed to the air so that will not be oxidized and hence the reflectivity of light can be maintained at a high value.

(3) The number of required parts can be reduced.

(4) Because of the use of FLC, the field of vision can be increased, and in addition, energy can be saved.

(5) There occurs absolutely no absorption loss and reduction in aperture factor due to the thickness of the nonlinear elements (active elements).

Further, when forming each picture element by connecting a nonlinear element (NE) and ferroelectric liquid crystal (FLC) in series, it was accomplished for the first time to realize a matrix system for a large area equal to or greater than that of the A4 size, by removing the cross talks between the picture elements.

In addition, the present invention has a feature that it became possible to realize a color display by providing red (called R), green (called G), and blue (called B) filters corresponding to the other Y-axis arrangement of the ferroelectric liquid crystal.

DESCRIPTION OF THE PREFERRED EMBODIMENT

The present invention will be described in accordance with an embodiment.

Figure 1B:
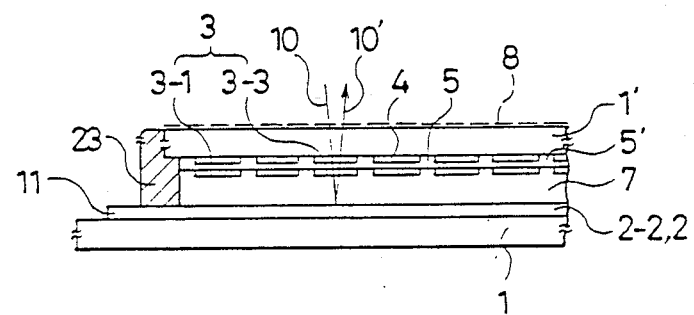

In FIG. 1(A) and FIG. 1(B) are shown a plan view and a longitudinal sectional view along A—A', respectively, of a passive liquid crystal display of the present invention. As may be clear from the figures, the display has electrode (2) consisting of electrode elements arrayed in substantially parallel linear pattern in the X-axis (2-1), (2-2), ..., and (2-n), and electrode (3), consisting of electrode elements arrayed in substantially parallel linear pattern in the Y-axis (3-1), (3-2), ..., and (3-m), with each of their overlying intersections consisting a dot (9) (for example, the intersection of 2-2 and 3-1).

Both of the electrodes (2) and (3) are interposed between a sandwich formed by first substrate (1) and second substrate (1') which is transparent.

Referring to FIG. 1B, the construction of the display can be seen. The bottom surface of the array comprising electrode (2) rests on the inner or upper surface of a first substrate (1), the upper surface of the electrode (2) having been coated by vacuum deposition of aluminum to provide a reflecting surface. Then, the upper surface of electrode 2 is covers by one of two formed asymmetric orientation layers. The layer covering electrode (2) is nonrubbed (a layer to which the rubbing treatment was not given) and is formed by coating 1% methanol solution of 1.1.1. trimethylsilazane by monomolecular coating method and drying.

Together, the so covered upper surface of electrode (2) and the upper surface of the substrate (1) substantially provide the bottom of the compartment which contains the FLC. Optionally, directly beneath electrode 2, there may be arranged other nonlinear elements.

Moving upward, one finds the lower surface of the array comprising electrode 3 which is covered with the other layer of the two formed asymmetric orientation layers. Electrode 3 is transparent being composed of conductive transparent film (CTF) formed specifically of indium-tin oxide (ITO) by sputtering. The covering layer is a rubber layer formed by coating and drying 1.1.1. trimethylsilazane on the CTF layer as in the above, and then by coating on top of it, by spinning method, 1% b-nylon solution obtained by diluting nylon in a solution of 60% m-cresol and 40% methanol.

Instead of b-nylon, PAN(polyacrylnitrile), and PVA(polyvinyl alcohol) were coated to a thickness of about 0.1 micron by spinning method, and rubbing treatment was given according to the known method. As an example of rubbing treatment, nylon was rotated at 900 RPM in the rubbing apparatus, and the surface was formed by moving the substrate at a speed of 2 m/min. Namely, on one of the electrode (2) there was formed an unrubbed film to serve as an orientation film with no rubbing, and on the other electrode (3) there was formed a film using the organic compounds mentioned above and a rubbing treatment was given to it. The unrubbed film may also be used as the inner surface of electrode (3). On the upper surface of the substrate (1') is provided a polarizing plate (8). In the color display embodiment, the upper surface of electrode (3) closely contacts a protective covering film (5) (use was made of a polyimide-based film in this case), the surface (5') being formed flat. Together, the so covered lower surface of electrode (3) and surface (5') substantially provide the top of the compartment which contains the FLC. The opposite surface of the covering film (5) encloses the surfaces of the filters (4) except for one lateral surface thereof which engages the lower surface of second substrate (1'). The filters (4) which are arranged substantially in overlying alignment to the elements of electrode 3 are arranged so as to repeat R (red), G (green) and B (blue) alternately. FIG. 1(B) illustrates the configuration for color display.

Returning to the elements of electrodes (2) and (3), it will be noted that the ends of the elements extend beyond the generally overlying substrates (1) and (1'). Specifically, these overlying portions 11 are external connection terminals (11) and (11'), for electrodes 2 and 3, respectively, so that the electrodes can be linked to the peripheral circuits by means of these terminals. Finally, serving to seal substrates (1) and (1') together in spaced relationship and to provide the peripheral wall to the compartment containing the FLC in smectic phase, sealing material (23) surrounds the entire periphery of the layered device. FLC E such as S8 (octyloxybenzlideneaminomethylbutyl benzoate) was filled in between the orientation treated layers. Besides S8, FLC such as BOBAMBC or FLC's obtained by blending a plurality of FLC's may also be used for filling. Some of these FLC's may be found in "Ferroelectrics Switing in the Tilted Smectic Phase of R-C-3-4-n-Hexyloxybenzylidence-4'-Amino-(2-chloropropyl) Cinnamate (HOBACPC)", Ferroelectrics, 1984, Vol. 59, pp. 126–136 by J. W. Goodby et al., Japanese patent application No. 59-98051, Japanese patent application No. 59-11874, and others.

Figure 2:
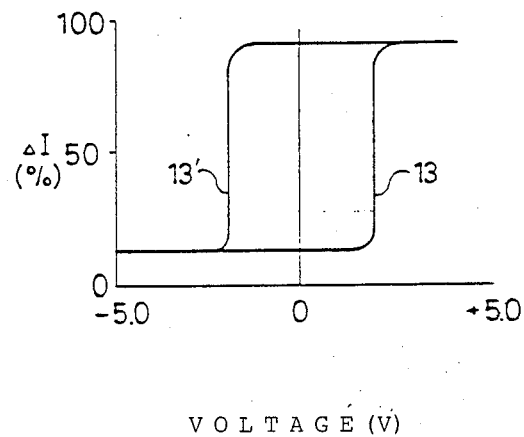
FIGS. 2(A) and 2(B) show the operation of the ferroelectric liquid crystal used in the present invention.
Figure 2:
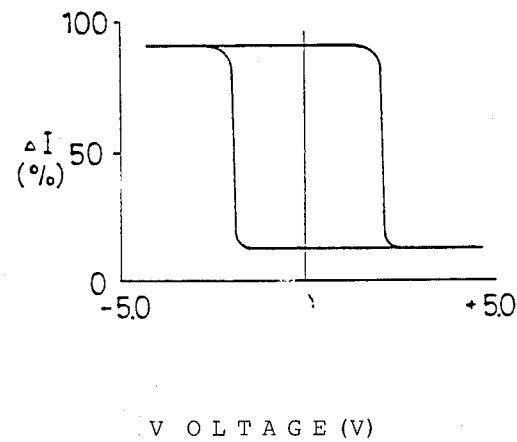

Examples of the threshold characteristics of the picture element are shown in FIG. 2(A) and FIG. 2(B). Depending upon the way in which the alignment direction of the liquid crystals and the direction of the voltage are chosen, one or the other of these figures will be obtained. However, they are substantially equivalent graphs. From the figures it will be seen that curves (13) and (13') are obtained by the application of voltages of ±5 V, transmission and nontransmission of light can be realized, and hysteresis with sufficient inversion and memory effect can be obtained. In FIG. 2 the ordinate represents the transmissivity.

In FIG. 1(B), for light in the visible region of the spectrum to be reflected, incident light (10) has to pass through the polarizing plate (8), the transparent substrate (1'), the filter (4), the protective film (5), the electrode (3) made from transparent conductive film, the asymmetrically orientation treated layer (not shown), smectic liquid crystals (7), and the reflecting electrode (2) where it is reflected to follow the reversed light path as the reflected light (10').

In this case, if there exists some kind of color as a medium in the filters (4) and the protective film (5) and it is desired to have an overall constant hue, the top surface of the reflecting electrodes (2) may be varied with variable thickness in the range of 300 to 1500 Å to form a CTF as an interference film of light.

As may be clear from the figures, if use is made of a liquid crystal with smectic phase, especially SmC* layer, then the liquid crystal functions as memory, and "on" and "off" of light can be controlled by the use of just one polarizing plate, provided that the tilt angle of the smectic layer is chosen to be about 45°. As a result, there will be no need for providing a reflecting plate on the outside of the first substrate using TN liquid crystal in a manner well known in the past. It only needs to use one of the electrodes as the reflecting electrode.

More important, the liquid crystal material has a thickness which is less than just 4 microns (generally 1 to 2 microns). For this reason, the incident light (10) and the reflected light (10') pass through an identical filter once for each. On the contrary, in the case of arranging a reflecting plate on the outside of the lower substrate (bottom side of the lower substrate (1) in the figure), as is done in the prior case of using TN liquid crystal, an incident light that passed through a filter which may be red, for instance, and upon reflection could pass through an adjacent green filter. If it happens, the reflected light when it comes out will have a color which is neither red nor green, and as a result of their mixing it will have a whitish hue.

In the case of the present invention, however, it has a significant feature that there will be no mixing with a color of the neighboring dot, because the distance between the filters (4) and the reflecting electrode (2) is less than 10 microns.

In FIG. 1(A) for the present invention, there is shown a 6×6 segment of a matrix, but it represents only a portion of the 100×100 matrix that was actually used in the experiment. However, the dot numbers may be given other configurations such as 640×400 (in the case of color it will be 1,920×400), 720×400, and so on.

It should be noted that various other forms of the present invention can be considered. Thus, for example, a dichroic material may be added to apparently improve the anisotropy of light absorption by SmC*. As such substances, one may mention, for example, azo-based or anthraquinone-based dyes (with dichroic ratio greather than 8) which can be dissolved in liquid crystals.

What is claimed is:

1. A liquid crystal device comprising:
a transparent substrate;
an opposite substrate;
a ferroelectric liquid crystal layer interposed between said transparent substrate and said opposite substrate; and
an electrode arrangement for inducing an electric field perpendicular to and across said crystal layer, said arrangement including a reflective electrode portion by which is reflected light passing through said transparent substrate and incident on said reflective electrode portion.

2. The liquid crystal display as claimed in claim 1, wherein said smectic liquid crystal material is one having ferroelectric property that displays the smectic C phase, and having a tilt of about 45°.

3. The liquid crystal display as claimed in claim 1, further comprising a dichroic material additive to said liquid crystal material.

4. The liquid crystal display as claimed in claim 3, wherein said additive is a dye with the dichroic ratio (CR) greater than 8.

5. The liquid crystal display as claimed in claim 4, wherein said dye is an anthraquinone-based or azo-based dye.

6. A liquid crystal device, comprising:
a first and a second substrate, said substrates, being in a spaced, substantially parallel relationship, and said first substrate being substantially transparent;
a polarizing plate, said plate overlying the exterior surface of said first substrate;
a ferroelectric liquid crystal layer interposed between said substrates;
an electrode arrangement for inducing an electric field perpendicular to and across said liquid crystal layer, said arrangement including a first electrode portion interposed between said first substrate and said liquid crystal layer and a second electrode portion interposed between said second substrate and said liquid crystal layer, said first electrode portion being substantially transparent and said second electrode portion being reflective such that light passing through said polarizing plate and said first substrate, which strikes said second electrode portion is reflected therefrom; and
a first and a second asymmetric orientation layer, said first asymmetric orientation layer interposed between said first electrode portion and said liquid crystal layer, and said second asymmetric orientation layer interposed between said second electrode portion and said liquid crystal layer.

7. The liquid crystal device as claimed in claim 6, wherein said liquid crystal layer displays the smectic C phase and has a tilt angle of about 45°.

8. The liquid crystal device as claimed in claim 7, wherein said liquid crystal layer is less than 4 microns in thickness.

9. The liquid crystal device as claimed in claim 8 wherein the thickness of said liquid crystal layer is in the range of 1 to 2 microns.

10. The liquid crystal device as claimed in claim 9 wherein said first asymmetric orientation layer is a rubbed layer and said second asymmetric orientation layer is a nonrubbed layer.

11. The liquid crystal device as claimed in claim 10, further comprising a dichroic material additive to said liquid crystal layer.

12. The liquid crystal device as claimed in claim 11, wherein said additive is a dye with a dichroic ratio (CR) greater than 8.

13. The liquid crystal device as claimed in claim 12, wherein said dye is an anthraquinone-based or azo-based dye.

14. The liquid crystal device as claimed in claim 13, further comprising a substantially co-planar series of color filters, said filters arranged across said series in a repeating alternating sequence of red, green, and blue, said series interposed between said first substrate and said first electrode portion in a spaced, substantially, parallel relationship with said first substrate, and said filters substantially overlying and aligned with individual elements of said first electrode portion.

15. The liquid crystal device as claimed in claim 14, further comprising a protective covering film interposed between said series and said first electrode portion to cover said series.

* * * * *